United States Patent [19]

Sato et al.

[11] Patent Number: 4,734,180
[45] Date of Patent: Mar. 29, 1988

[54] BIPOLAR ELECTROLYZER AND UNIT CELL

[75] Inventors: Masatoshi Sato, Zama; Keiji Miyoshi, Nobeoka, both of Japan

[73] Assignee: Asahi Kasei Kogyo Kabushiki Kaisha, Osaka, Japan

[21] Appl. No.: 921,480

[22] Filed: Oct. 22, 1986

[30] Foreign Application Priority Data

Oct. 23, 1985 [JP] Japan .................. 60-235292

[51] Int. Cl.⁴ .................. C25B 9/04; C25B 13/04
[52] U.S. Cl. .................. 204/254; 204/268; 204/279
[58] Field of Search .................. 204/254–256, 204/268, 279

[56] References Cited

U.S. PATENT DOCUMENTS

| | | | |
|---|---|---|---|
| 4,108,752 | 8/1978 | Pohto et al. | 204/256 |
| 4,111,779 | 9/1978 | Seko et al. | 204/255 |
| 4,141,815 | 2/1979 | Ichisaka et al. | 204/254 X |
| 4,402,809 | 9/1983 | Dilmore | 204/254 |
| 4,581,114 | 4/1986 | Morris et al. | 204/279 |
| 4,643,818 | 2/1987 | Seko et al. | 204/253 |

FOREIGN PATENT DOCUMENTS

| | | |
|---|---|---|
| 0075401 | 3/1983 | European Pat. Off. . |
| 0172495 | 2/1986 | European Pat. Off. . |
| 2551234 | 5/1976 | Fed. Rep. of Germany . |
| 54-90079 | 7/1979 | Japan . |

OTHER PUBLICATIONS

S. A. Zaretski et al, "Electrochemical Technology of Inorganic Elements and Chemical Current Sources" (1980, pp. 302–303).
V. M. Zimin et al, "Chloric Electroylyzers", (1984, pp. 244–245).

*Primary Examiner*—Donald R. Valentine
*Attorney, Agent, or Firm*—Birch, Stewart, Kolasch & Birch

[57] ABSTRACT

A bipolar type electrolyzer unit cell includes an anode-side pan-shaped body and a cathode-side pan-shaped body which each comprise a hooked frame, frame wall, and partition wall and are disposed back to back; rod shaped frames inserted between the hooked flange and the frame wall in each body, and a bipolar type of electrolyzer in which a plurality of the unit cells is arranged in series.

16 Claims, 8 Drawing Figures

BIPOLAR ELECTROLYZER AND UNIT CELL

FIELD OF THE INVENTION

The present invention relates to an electrolyzer and a structure of unit cells thereof. More particularly, the present invention relates to the structure of an electrolyzer which is easy to assemble and disassemble. The present electrolyzer units are adapted not only for the electrolysis of alkali metal chlorides to produce chlorine and alkali metal oxides but also for other electrolysis such as water electrolysis.

BACKGROUND OF THE INVENTION

As of the present time, a number of different electrolyzers employing ion exchange membranes have been proposed for the purpose of electrolyzing aqueous solutions of alkali metal chlorides, particularly sodium chloride.

With respect to bipolar type electrolyzers, there have been proposed, for example an electrolyzer in which the partition walls of the adjacent unit cells are explosion-bonded to establish an electrical connection between the adjacent unit cells (see, for example, U.S. Pat. No. 4,111,779), an electrolyzer in which a conductive strip having a form capable of producing a spring-like force is interposed between the adjacent unit cells to provide an electrical connection therebetween (see, for example, U.S. Pat. No. 4,108,752), an electrolyzer in which unit cells are made of a plastic material and the adjacent unit cells are electrically connected by means of a bolt and a nut (see, for example, German Patent Appln. No. 2551234), and an electrolyzer in which the adjacent unit cells are electrically connected through junctions formed by ultrasonic welding or the like of titanium-copper stainless steel (Japanese Patent Application Laid-Open No. 90079/79).

Although various improvements have been made to fit electrolyzers for the electrolysis of sodium chloride according to the ion exchange membrane system, the above-mentioned prior art electrolyzers are still not satisfactory in that the assemblage thereof may be complicated, processing for fabrication thereof may be difficult, electrolyte leakage may occur at any welds thereof, or the fabrication thereof may be expensive.

SUMMARY OF THE INVENTION

Accordingly, it is an object of the present invention to provide an electrolyzer, particularly a bipolar, ion exchange membrane type of alkali metal chloride electrolyzer, which is easy to assemble and disassemble, has less welds, and is not liable to electrolyte leakage, simple in the processing of components, and inexpensive.

It is another object of the present invention to provide unit cells for use in the above electrolyzer which are easy to assemble and disassemble and have less welds.

These and other objects and advantages of the invention will be apparent from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
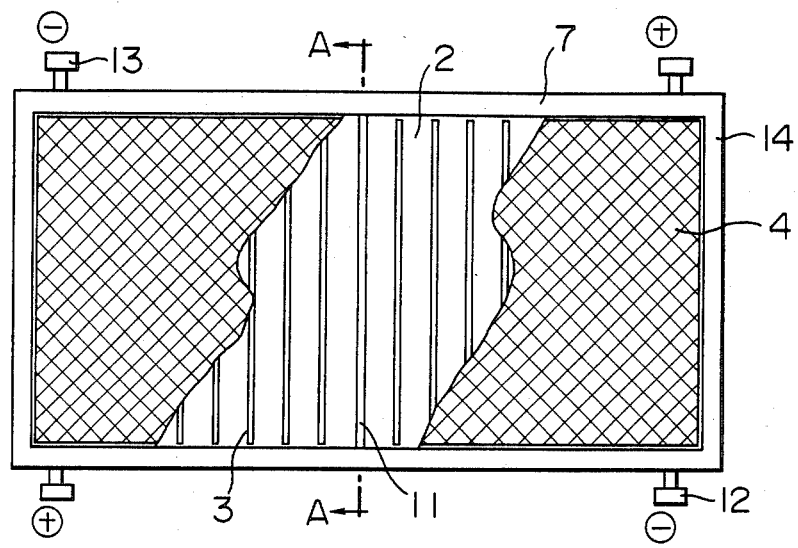
FIG. 1 is an elevational view of an assembled unit cell, a preferred embodiment of the present invention, comprising anode and cathode chambers for constructing an electrolyzer.

Numerals in the drawings and in the present specification represent the following parts:

1 ... Rod-shaped frame, 2 ... Pan-shaped body, 3 Rib for electric conduction, 4 ... Electrode, 5 ... Hole, 6 ... contact portion, 7 ... Hooked flange, 8 ... Frame wall, 9 ... Partition wall, 10 ... Electrode chamber, 11 ... Reinforcing rib, 12 ... Inlet nozzle, 13 ... Outlet nozzle, 14 ... Corner portion, 15 ... Cation exchange membrane, 16 and 17 ... Gaskets, 18 ... Anode chamber, 19 ... Cathode chamber, 20 ... Side bar, 21 ... Connecting portion, 22 ... Terminal plate, 23 ... Explosion-bonding plate (not depicted), 24 ... Bipolar type of unit cell constructing electrolyzer, 25 ... Nozzle hole in rod-shaped frame, 26 ... Nozzle hole in frame wall, 27 ... End half cell unit, 28 ... Frame space (not depicted), 29 Groove, 30 ... Hook portion, 31 ... Fixed head, 32 ... Rear head, 33 ... Loose head.

DETAILED DESCRIPTION OF THE INVENTION

It has been found that the above objects are best achieved with a unit cell constructed of an anode-side pan-shaped body and a cathode-side pan-shaped body which each comprise each a hooked flange, frame wall, and partition wall and are disposed back to back; and rod-shaped frames inserted between the hooked flange and the frame wall in each body. Based on these findings, the present invention has been developed.

Thus, the bipolar type of ion exchange membrane diaphragmed electrolyzer which is an embodiment of the invention comprises:

a plurality of bipolar unit cells each constructed of an anode-side pan-shaped body and a cathode-side pan-shaped body which comprise each a hooked flange, frame wall, and partition wall and are disposed back to back; rod-shaped frames inserted between the hooked flange and the frame wall in each body; an anode and a cathode which are each welded with the partition wall through electrically conductive ribs; and a cation exchange membrane disposed between the anode-side body and the cathode-side body of another unit cell adjoining the anode so that the electrode-less sides of the two bodies will face each other, two opposite-end half cell units containing an anode and a cathode, respectively, and two electrical terminal plates attached severally to the opposite-end half cell units, the plurality of unit cells being arranged in series.

As obvious to persons skilled in the art, the electrolysis of water requires no ion exchange membrane.

The principal parts of the above bipolar type of electrolyzer are bipolar unit cells constructed each of an anode-side pan-shaped body and a cathode-side pan-shaped body which each comprise a hooked flange, frame wall, and partition wall and are disposed back to back; and rod-shaped frames each inserted into a groove formed between the hooked flange and the frame wall in each body, the upper and lower rod-shaped horizontal frames each having two holes in each of opposite end portions thereof. This unit cell is featured by being easy to assemble. The pan-shaped body, when constructed of one plate, is advantageous over those constructed of plural plates not only in the aspect of processing but also in that the probability of electrolyte leakage can be markedly decreased since welded portions can be reduced. Moreover, the unit cell is completed merely by disposing the two pan-shaped bodies back to back and inserting the rod-shaped frames between each hooked flange and the adjacent frame wall, as stated above. In this respect, the assembly is also easy.

For inserting the rod-shaped frames, it is advisable that rod-shaped frames shorter by the thickness of rod-shaped horizontal frames than the unit cell height, are inserted vertically and then the rod-shaped frames having a length equal to the cell width are inserted horizontally or that rod-shaped frames shorter by the thickness of the frame than the width and height, respectively, of the unit cell are inserted in turn so as to form a two-dimensional lattice-like pattern. The latter way is preferable in view of the strength and assemblage of the unit cell.

Other devices or means for constituting the unit cell are similar to those of the prior art unit cell. It may be unnecessary to describe these other devices of means. Any person skilled in the art would readily construct the unit cell without learning of the further detailed structure thereof. That is, as to the ion exchange membrane, gaskets, etc., those of conventional types can be used.

Alkali metal chlorides electrolyzable by using the apparatus of the present invention include, for example, sodium chloride, potassium chloride, and lithium chloride. Of these, sodium chloride is the most important industrially. The present apparatus is applicable, of course, to water electrolysis.

The present invention is described below with reference to the electrolysis of sodium chloride as an example. Needless to say, the invention is not limited thereto.

The electrolyzer unit cell of the present invention is very simply assembled and disassembled because it can be fabricated by disposing a pair of pan-shaped bodies containing an anode and a cathode, respectively back to back and inserting rod shaped frames between the hooked flange and the frame wall in each body. In addition, each pan-shaped body can be constructed of one plate and hence the number of welded portions of the body are extremely minimized so that strain caused by processing and electrolyte leaks are reduced to the smallest amounts possible and the cell can be constructed at a very low cost.

Referring now to the drawings, preferred embodiments of the present electrolyzer invention are described. However, the present invention is not limited to those shown in these drawings.

Figure 2:
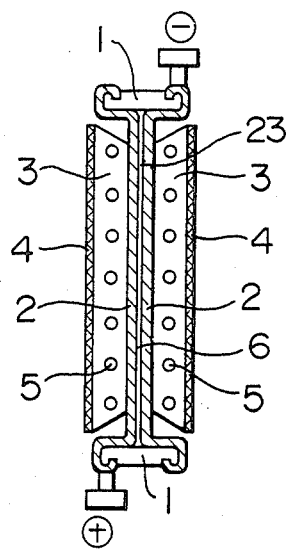
FIG. 2 is a cross-sectional view taken on line A—A' of FIG. 1.
Figure 3:
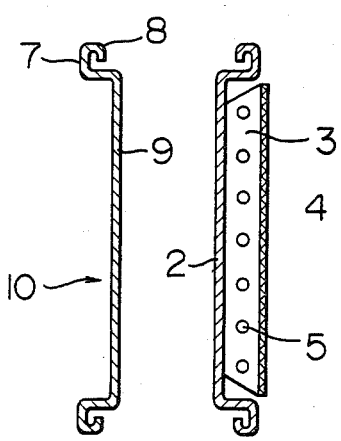
FIG. 3 illustrates the structure of pan-shaped bodies constructing the anode and cathode chambers, respectively, of a unit cell.
Figure 4:
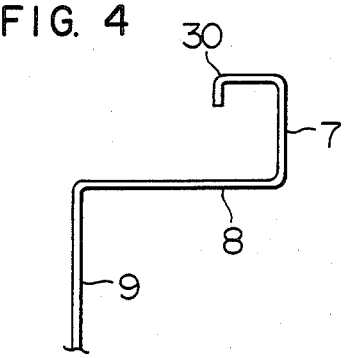
FIG. 4 is a detailed view of a hooked flange used in the unit cell.
Figure 5A:
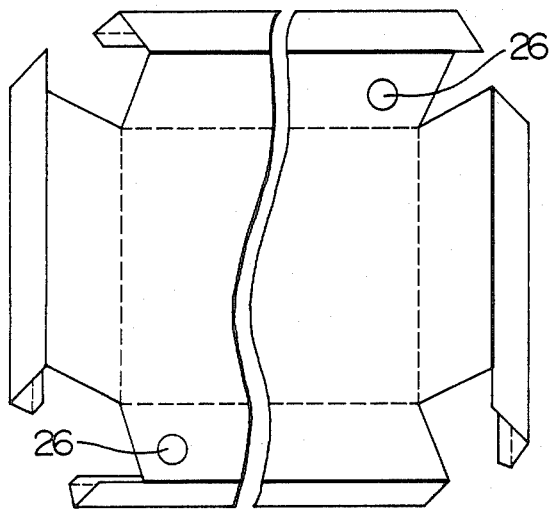
FIGS. 5(a) and 5(b) illustrate the state of fabricating the pan-shaped body in preferred embodiments of the invention, respectively.
Figure 5B:
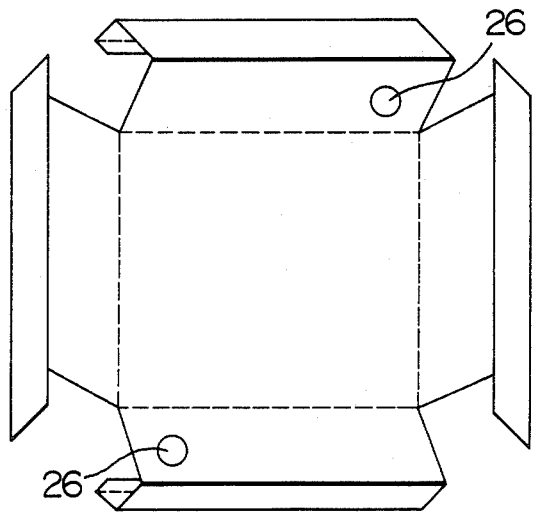
Figure 6:
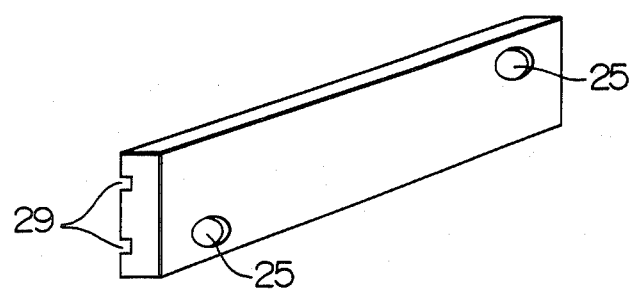
FIG. 6 is a perspective view of a rod-shaped frame of the unit cell.
Figure 7:
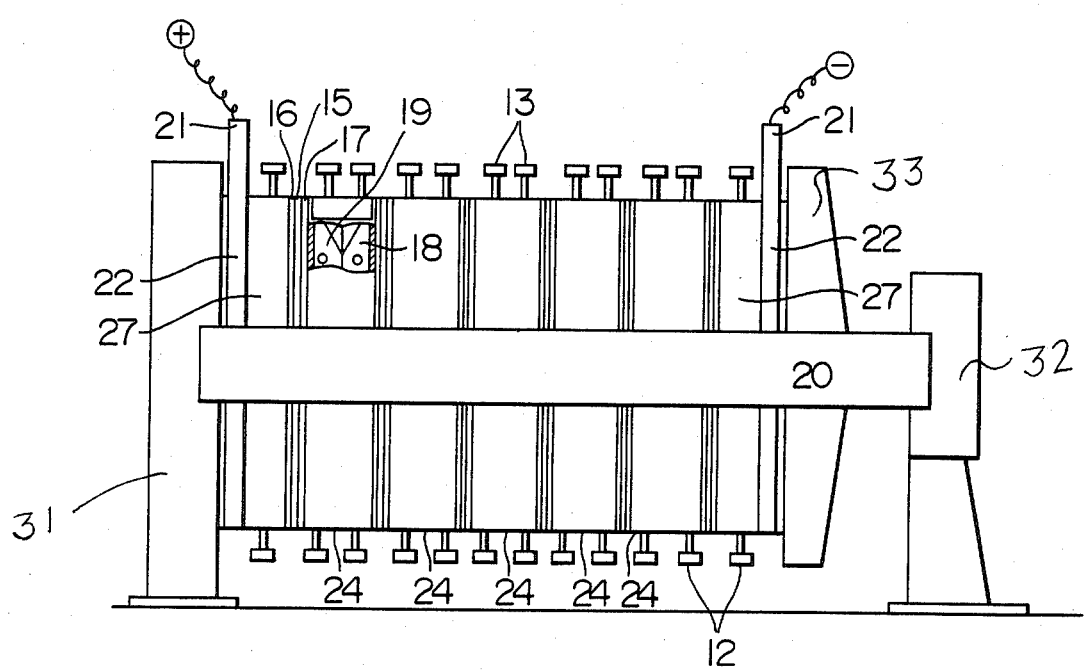
FIG. 7 illustrates the assemblage of a bipolar electrolyzer constructed of unit cells in a preferred embodiment of the invention.

FIG. 1 is an elevational view of an electrolyzer unit cell in a preferred embodiment of the invention; FIG. 2 is a cross-sectional view taken on line A—A' of FIG. 1; FIG. 3 illustrates the structure of a preferred embodiment of the pan-shaped body; FIG. 4 is a detailed view of the hooked flange; FIG. 5 illustrates the state of fabricating the pan-shaped body, as an embodiment; FIG. 6 is a perspective view of the rod-shaped frame; and FIG. 7 illustrates the assemblage of a bipolar type of electrolyzer as a preferred embodiment. The same numerals in the drawings have the same meaning; 1: rod-shaped frame, 2: pan-shaped body, 3: rib for electric conduction, and 4: electrode.

The ribs 3 for electric conduction (hereinafter referred to as conductive ribs) are welded to the pan-shaped body and the electrode 4 is welded to the opposite sides of the ribs 3. As shown in FIG. 4, the pan-shaped body 2 is constructed of a hooked flange 7, a frame wall 8, and a partition wall 9. The space surrounded by the frame wall 8 and the partition wall 9 serves as an anode chamber or a cathode chamber. The anode and cathode chambers are sealed with gaskets. Suitable materials for the gaskets are ethylene/propylene rubber, PTFE, etc. Each gasket for the anode or cathode chamber is desired to have a width equal to the seal width. The thickness of gaskets for the anode and cathode chambers generally ranges from 1.0 to 3.0 mm.

Each rod-shaped frame 1 is inserted into a space 28 (not depicted) formed by each hooked flange 7 and the adjacent frame wall 8 which are combined together back to back. In each rod-shaped frame 1, a groove is formed to join the tip of each hooked flange thereto. The hook portion 30 of each hooked flange 7 may have such a length that the flange will not come off, when fitted into a groove 29 formed in each rod-shaped frame, and may have a length necessary for the bending operation. Such lengths are 2 to 20 mm, preferably 5 to 10 mm.

The length in the electric current direction of the frame wall 8 corresponds to the thickness of the anode or cathode chamber and is generally from 10 to 100 mm.

The height of the partition wall corresponds to that of the anode chamber as well as that of the cathode chamber, which is generally from 50 to 200 cm. The transverse width of the partition wall also corresponds to that of the anode chamber as well as that of the cathode chamber, which is generally from 20 to 400 cm. The thickness of the pan-shaped body 2 may be such that the bending of its material plate is possible and the body withstands the internal pressure, and the conductive ribs can be welded to the body, that is, the thickness desirably ranges from about 1 to about 3 mm.

The conductive ribs 3 are welded to the pan-shaped body 2 and each provided with five holes for passing the electrolyte and the electrolysis product. The thickness of the conductive rib is chosen so that the gap between the ion exchange membrane and each electrode will be zero or almost zero, by considering the length of the frame wall 8, the thickness of sealing gaskets 16 and 17, and the thickness of each electrode 4.

Reinforcing ribs may be fixed desirably in the middle part of each electrode chamber, if the chamber needs to be further strengthened. The material of these ribs for the cathode chamber is the same as that of the cathode-side pan-shaped body, that is, iron, nickel, stainless steel, or an alloy of these metals. The material of the ribs for the anode chamber is also the same as that of the anode-side body, that is, titanium or a titanium alloy. It is suitable for this reinforcement that two plates having the same form as that of the conductive ribs are bonded together at a plurality of plane junctions. Desirably, such a reinforcement is brought into intimate contact with the frame wall and the rod-shaped frames. Similarly to the conductive ribs, the reinforcing ribs are each provided with holes for passing the electrolyte and the electrolysis product.

For the electrodes 4, metals having a number of holes may be used without any restriction on the shape. Such metal sheets include, for example, expanded metals, and metal sheets in the form of perforated flat plate, combined rods, or wire gauze.

As to the rod-shaped frames 1, two horizontal and two vertical frames are necessary for one unit cell. Each horizontal rod-shaped frame has a nozzle hole 25. The hook portion 30 of each hooked flange 7 is fitted into the groove 29. The length each of the upper and lower rod-shaped frames 1 corresponds with the sum of the transverse width of partition wall 9 and one half of the seal face width of the hooked flange 7. The length of each vertical rod-shaped frame 1 corresponds with the sum of the height of partition wall 9 and one half of the seal face width of the hooked flange 7.

The cross-sectional shape of each rod-shaped frame 1 is identical with that of the space formed by each hooked flange 7 and the adjacent frame wall 8. The surface of the rod-shaped frames 1 is desirably protected with a rubber lining, an epoxy resin coating, or the like for the purpose of electric insulation or corrosion prevention.

Materials for constructing the pan-shaped bodies 2 and the conductive ribs 3 may be metals or alloys anticorrosive under the conditions of electrolysis. For example, titanium and titanium alloys can be used for the anode-side pan-shaped body and iron, nickel stainless steel, and alloys of these metals can be used for the cathode-side pan-shaped body.

The anode material may be any of those used for the conventional electrolysis of aqueous alkali metal chloride solutions. That is, the anode is fabricated by processing a base material such as titanium, zirconium, tantalum, niobium, or an alloy of these metals, and coating the shaped base material with an anodically active material consisting mainly of a platinum-group metal oxide such as ruthenium oxide. For the cathode, a shaped iron, nickel, or alloy of these metals is used as such or after being coated with a cathodically active material such as Raney nickel, Rhodan nickel, or nickel oxide.

For the rod-shaped frames 1, there may used, without any restriction, metals such as iron, stainless steel, and the like and plastics such as polyethylene, polypropylene, polyvinyl chloride, and the like, though metals are preferred to secure the strength of the electrolyzer. These frames may be either solid or hollow though the solid frames are preferred from the viewpoint of the frame strength.

The pan-shaped body 2 is fabricated, for example, in the following way: As shown in FIG. 5(a), a plate, previously bent at the four corners, is cut so as to form a pan-shaped body, and a hooked flange 7 and a frame wall 8 are shaped by bending the plate along dotted and full lines as shown in FIG. 5(a). Accordingly, welding will be necessary only at the four corners. Thus, necessary welded portions are greatly reduced and remaining strain is also decreased, as compared with the case of the prior art and hence each of the fabrication steps is improved. This is one of the effects of the present invention.

In addition, the electrode-fixing sites of the conductive ribs and the seal faces of the hooked flanges, which, according to the prior art, would be machined since strain due to welding or the like remains after assemblage, can be processed precisely without leaving substantial strain according to the present invention since the operation is simple as stated above and hence the machining is unnecessary and the fabrication cost is low. This is another effect of the invention.

The assemblage of the present inventive unit cell is accomplished in the following way: The fabricated pan-shaped bodies for anode and cathode chambers are disposed back to back. These two bodies may be united together by welding, for instance, at junctions 6, or may not be united. However, the union is preferable since it results in low electric resistance. This may be accomplished by direct ultrasonic welding or spot welding with an explosion-bonding titanium-iron plate being interposed.

Then, the rod-shaped frames 1 are inserted into the space formed between the hooked flange 7 and the frame wall 8 in order to upper, right, lower, and left frames to erect the body. Thereafter, an electrolyte inlet nozzle 12 and an electrolyte outlet nozzle 13 are inserted into the upper side nozzle hole 25 and lower side nozzle hole 25, respectively, of the rod-shaped frames, and the gap between the inlet nozzle and a hole 26 bored through the lower frame wall 8 is sealed and also the gap between the outlet nozzle and a hole 26 bored through the upper frame wall 8.

There is no particular restriction on the kind of cation exchange membrane 12 for use in the present invention. Any membrane may be employed that is generally used for the electrolysis of an aqueous alkali metal chloride solution.

Suitable resins for the cation exchange membrane include, for example, those of sulfonic acid, carboxylic acid, sulfonamide, and carboxylic acid-sulfonic acid combination types. Of these, the carboxylic acid-sulfonic acid combination type of resin is specially preferred because it gives a large transference of alkali metal ions. In the case of the combination type, the cation exchange membrane may be disposed most desirably between the anode and the cathode so that the anode will face a side where sulfonic acid groups are present, of the cation exchange membrane and the cathode will face the other side, where carboxylic acid groups are present, of the membrane. With respect to the resin matrix of the cation exchange membrane, fluorocarbon resins are advantageous from the viewpoint of chlorine resistance. The membrane may be reinforced with a cloth, netting, or the like for the purpose of increasing the membrane strength.

The following example illustrates the present invention without limiting the scope of the invention.

EXAMPLE

A dipolar type of electrolyzer as shown in FIG. 7 was assembled which comprises five unit cells and two end half cell units 27 which are unit cells, one consisting of an anode chamber alone and the other consisting of a cathode chamber alone, and are provided each with an electrical terminal plate 22, by using side bar 20, a fixed head 31, rear head 32, and loose head 33.

Each unit cell is 2400 mm in transverse width, 1200 mm in height, and 54.5 mm in thickness and has hooked flanges, the seal face of each flange being 21 mm in width, and reinforcing ribs 11 of 26 mm in height and 5 mm in thickness in the middle section. Each reinforcing rib 11 has 10 holes 5 of 8 mm diameter for passing the electrolyte and the electrolysis product. The pan-shaped body of the anode chamber and conductive ribs therein are formed of titanium and the pan-shaped body of the cathode chamber and conductive ribs therein are formed of stainless steel.

The pan-shaped body of the anode chamber and that of the cathode chamber are 1.0 mm thick and 1.5 mm thick, respectively, and have been shaped by press bending to pan form. The two bodies are joined together by spot welding using an explosion-bonding titanium-iron plate inserted therebetween. Rod-shaped frames 1 are each inserted into a space formed between each hooked flange 7 and the adjacent frame wall 8. These frames 1 are inserted one by one to produce an assembly in the form of a two-dimensional lattice. The corners of each body are fixed by bolting. On the insides of the pan-shaped bodies 2, the conductive ribs 3 are welded at intervals of 12 cm so that the conductive ribs in the anode chamber and those in the cathode chamber will be fixed at the same relative positions. Each conductive rib for the anode is 26 mm in height, and 5 mm in width and each conductive rib for the cathode is 28 mm in height and 5 mm in width. In each conductive rib, 10 holes 5 of 8 mm diameter are bored for passing the electrolyte and the electrolysis product.

The anode was fabricated by boring holes of 1.5 mm diamter in zigzag form at pitches of 2.5 mm in a 1-mm thick titanium plate, and coating the plate with an acid-containing solid solution composed of ruthenium, iridium, titanium, and zirconium.

The cathode was fabricated by boring holes of 1.5 mm diameter in zigzag form at pitches of 2.5 mm in a 1-mm thick stainless steel plate, and coating the plate with nickel oxide.

The electrical terminal plates 22 were formed of 4-mm thick copper plates. A gasket 16 for the anode chamber was formed of an ethylene-propylene rubber 1.5 mm thick and a gasket 17 for the cathode chamber was also formed of an ethylene-propylene rubber 2.5 mm thick. The shape of each gasket is similar to that of a picture frame having the same width as that of the seal face of the hooked flange 7.

The cation exchange membrane was prepared in the following manner: Tetrafluoroethylene was copolymerized with perchloro-4,7-dihydroxy-5-methyl-8-nonenesulfonyl fluoride under different conditions to yield a polymer (polymer 1) having an equivalent weight of 1300 and a polymer (polymer 2) having an equivalent weight of 1130.

These polymers were heated to form a two-layer laminate of a 35-$\mu$ thick sheet of polymer 1 and a 100-$\mu$ thick sheet of polymer 2. A woven Teflon (tradename) textile was embedded into the laminate on the polymer 2 side by a vacuum laminating method. This laminate was saponified, and the polymer 1 side alone of the obtained sulfonic acid type of cation exchange membrane was subjected to a reduction treatment, thereby converting the sulfo groups into carboxy groups.

The electrolyzer shown in FIG. 7 was assembled so that the carboxy-containing layer of the cation exchange membrane would face the cathode.

Then, sodium chloride was electrolyzed as follows: An aqueous solution containing 310 g/l of sodium chloride was fed into each anode chamber at such a flow rate that the sodium chloride concentration at the outlet would be 175 g/l. On the other hand, a dilute aqueous sodium hydroxide solution was fed into each cathode chamber at such a flow-rate that the sodium hydroxide concentration at the outlet would be 30% by weight. As to other electrolysis conditions, the electrolyte temperature was 90° C. and the current density was 40 A/dm². The results showed a current efficiency of 96.0% and a cell voltage of 18.6 V.

What is claimed is:

1. A bipolar electrolyzer comprising:
   a plurality of bipolar unit cells each constructed of an anode-side pan-shaped body and a cathode-side pan-shaped body, each pan-shaped body including a hooked flange, frame wall, and partition wall, corresponding anode-side and cathode-side pan shaped bodies being disposed back to back;
   rod-shaped frames inserted between the hooked flange and the frame wall in each pan-shaped body; and
   an anode and a cathode which are welded to a corresponding partition wall through electrically conductive ribs,
   said plurality of unit cells being arranged in series.

2. The bipolar elctrolyzer of claim 1, wherein the frame wall of each pan-shaped body is formed on one plate.

3. The bipolar electrolyzer of claim 1, wherein the anode-side and cathode-side pan-shaped bodies are welded to each other.

4. The bipolar electrolyzer of claim 1, which further comprises a cation exchange membrane disposed between the anode-side body and the cathode-side body of another unit cell adjoining to said anode so that the electrode-less sides of the two bodies will face each other.

5. A bipolar electrolyzer unit cell comprising an anode-side pan-shaped body and a cathode-side pan-shaped body, each pan-shaped body including a hooked flange, frame wall, and partition wall, and being disposed back to back; and rod-shaped frames inserted between the hooked flange and the frame wall in each body.

6. The electrolyzer unit cell of claim 5, wherein the frame wall of each pan-shaped body is formed of one plate.

7. The electrolyzer unit cell of claim 5, wherein the anode-side and cathode-side pan-shaped bodies are welded to each other.

8. A bipolar electrolyzer comprising:
   a plurality of bipolar unit cells each constructed of an anode-side pan-shaped body and a cathode-side pan-shaped body, each pan-shaped body including a hooked flange, frame wall, and partition wall, wherein corresponding anode-side and cathode-side pan-shaped bodies are disposed back to back;
   rod-shaped frames, having grooves formed therein at each side, inserted between the hooked flange and the frame wall in each pan-shaped body so that the hooked shaped flange fits into said grooves in said rod-shaped frames to firmly maintain said rod-shaped frames between said pan-shaped bodies; and
   an anode and a cathode which are each welded to a corresponding partition wall through electrically conductive ribs,
   said plurality of unit cells being arranged in series.

9. The bipolar electrolyzer of claim 8, wherein the frame wall of each pan-shaped body is formed of one plate.

10. The bipolar electrolyzer of claim 8, wherein the anode-side and cathode-side pan-shaped bodies are welded to each other.

11. The bipolar electrolyzer of claim 8, which further comprises a cation exchange membrane disposed between the anode-side body and the cathode-side body of another unit cell adjoining said anode so that the electrode-less sides of the two bodies will face each other.

12. The bipolar electrolyzer of claim 8, wherein said electrolyzer has the configuration as shown in FIG. 2.

13. The bipolar electrolyzer of claim 8, wherein a cross-sectional shape of said rod-shaped frames is identical to the shape of the space formed by each hooked flange and corresponding frame wall.

14. The bipolar electrolyzer of claim 13, wherein said partition wall, frame wall and hooked flange have the configuration shown in FIG. 4.

15. The bipolar electrolyzer of claim 8, wherein said hooked flange comprises a first portion perpendicular and connected to said frame wall, a second portion connected to said first portion so as to be parallel to said frame wall, and a tip portion which is perpendicular to said frame wall and connected to said second portion.

16. The bipolar electrolyzer of claim 15, wherein said tip portion is joined to a groove in a rod-shaped frame.

* * * * *